United States Patent [19]
Borlinghaus et al.

[11] Patent Number: 5,375,653
[45] Date of Patent: Dec. 27, 1994

[54] HEAT EXCHANGER SYSTEM WITH TURBULATOR FOR PARTICLE-IN-LIQUID DISPERSION

[75] Inventors: Axel Borlinghaus, Becholsheim; Howard R. Steen, Schmitten, both of Germany

[73] Assignee: The Procter & Gamble Company, Cincinnati, Ohio

[21] Appl. No.: 122,261

[22] Filed: Sep. 16, 1993

[51] Int. Cl.⁵ ............................................. F28F 13/12
[52] U.S. Cl. ................................. 165/109.1; 165/158
[58] Field of Search ..................... 165/109.1, 174, 158

[56] References Cited

U.S. PATENT DOCUMENTS

| | | | |
|---|---|---|---|
| 2,268,386 | 12/1941 | Fisher | 165/159 |
| 2,602,647 | 7/1952 | Miller | 165/109.1 X |
| 2,717,049 | 9/1955 | Langford | 165/109.1 X |
| 3,407,875 | 10/1968 | Campbell | 165/174 |
| 4,594,152 | 6/1986 | Gullichsen | 209/273 |
| 5,261,485 | 11/1993 | Thornton et al. | 165/174 |

FOREIGN PATENT DOCUMENTS

| | | | |
|---|---|---|---|
| 787158 | 9/1935 | France . | |
| 306359 | 6/1955 | Germany . | |
| 1000194 | 1/1957 | Germany | 165/174 |
| 1063764 | 2/1957 | Germany . | |

OTHER PUBLICATIONS

English Abstract of European Patent Document EP 275–502-A, Jul. 27, 1988, Derwent Publication Ltd., Derwent data base accession No. 88–206665/30.
English Abstract of German Patent Document DE 3303–019-A, Aug. 2, 1984, Derwent Publications Ltd., Derwent data base accession No. 84–196083/32.
English Abstract of German Patent Document DD 215–155-A, Oct. 31, 1984, Derwent Publication Ltd., Derwent data base accession No. 85–056503/10.

*Primary Examiner*—John Rivell
*Assistant Examiner*—L. R. Leo
*Attorney, Agent, or Firm*—William J. Winter; Ronald W. Kock

[57] ABSTRACT

The present invention relates to a heat exchanger system having a nest of tubes through which a particle-in-liquid dispersion flows and which has an entrance chamber in which the particle-in-liquid dispersion is provided with a rotational flow in order to prevent particles from being trapped in the low flow regions between tube entrances. In particular the present invention relates to a heat exchanger system having a static turbulator insert in front of the heat exchanger entry providing a rotation flow pattern relative to the main flow direction of the heat exchanger tubes.

4 Claims, 2 Drawing Sheets

HEAT EXCHANGER SYSTEM WITH TURBULATOR FOR PARTICLE-IN-LIQUID DISPERSION

The present invention relates to a heat exchanger system having a nest of tubes through which a particle-in-liquid dispersion flows and which has an entrance chamber in which the particle-in-liquid dispersion is provided with a rotational flow in order to prevent particles from being trapped in the low flow regions between tube entrances. In particular the present invention relates to a heat exchanger system having a static turbulator insert in front of the heat exchanger entry providing a rotation flow pattern relative to the main flow direction of the heat exchanger tubes.

BACKGROUND ART

The prior art on heat exchangers made of pipes or nests of tubes is very crowded and contains many references to turbulence generating devices to improve the heat transfer coefficient of the heat exchanger. In particular the following disclosures give an overview on information available regarding turbulators in heat exchanges.

EP-A-329 448 discloses a turbulator in form of a double helix spiral inside a heat exchanger pipe. The drawings of USSR patent application 821 846 show a propeller insert to increase turbulence inside heat exchanger tubes. U.S. Pat. No. 4,938,281 discloses turbulators in a heat exchange conduit which has a corrugated wall to further improve the heat transfer coefficient between the conduit wall and the liquid inside the conduit. French publication FR 2,483,594 also discloses heat exchanger tubes with turbulators in the tubes. German patent DE-C-30 15 758 discloses a rotational flow in a heat exchanger pipe using a propeller insert at the point of flow direction change.

EP-A-75 175 discloses a process and apparatus for improved heat exchange on a flat surface by creating a rotational turbulence relative to that flat surface to increase the heat exchange efficiency, particularly when cooling the surface. German publication DE-A-33 12 143 discloses an improved heat exchange process and apparatus by using a particular entry plate design to increase the turbulence of the flow in the entry part of the tubes of the heat exchanger. GDR patent DD-215 155 discloses a rotation turbulator in the entry chamber of a heat exchanger to increase the turbulence in the heat exchanger tubes and thereby the heat transfer coefficient. EP-A-275 502 discloses a method for heating and cooling paper pulps and a heat exchanger apparatus for applying the method. It describes a fluidisator in the entry region of a nest of tubes of a heat exchanger to destroy interparticulate bonds in the paper pulp liquid. German disclosure DE-C-3226 420 discloses a mixing system to allow thorough mixing of single or multiple face systems. The mixing is conducted by displacing part of a stream relative to the others and reuniting them behind a mixing unit.

The problem underlying most of these prior disclosures apparently is to improve the heat transfer coefficient or heat exchange efficiency in the tubes of a heat exchanger system. The objective of the present invention is to prevent clogging and sedimentation of particles from a particle-in-liquid dispersion in the entry chamber of a heat exchanger. In particular the present invention is suitable for aseptic liquid streams like for example fruit juices containing fruit pulp particles. Aseptic systems are very difficult to maintain and any opening of a closed aseptic system, for example to clean the heat exchanger entrance, to eliminate clogged tubes of a heat exchanger requires a major effort to re-establish a sterile system.

It is therefore another objective of the present invention to provide a longer aseptic running time for heat exchanger systems for cooling or heating of fruit juice containing liquids which also contain fruit pulp particles. It is a further objective of the present invention to provide this improvement of a heat exchanger system in such a way that the sterilizing to establish aseptic conditions in the heat exchanger system does not require additional steps. Therefore it is an objective to provide a static turbulator because of the problems associated with seals and bearings of driven or rotating turbulators and the difficulty to sterilize them.

SUMMARY OF THE INVENTION

The invention relates to a heat exchanger system for a particle-in-liquid dispersion which comprises a nest of tubes through which the dispersion flows and the use of such a heat exchanger system. The heat exchanger has an inlet to the nest of tubes which is splitting up the dispersion to enter the individual tubes. A key element of the heat exchanger is a turbulator insert upstream from the inlet which provides the particle-in-liquid dispersion with a current which has a perpendicular component to the main flow direction through the heat exchanger. In particular this turbulator can provide such a flow pattern that a rotational or spiraling current is superimposed to the main flow direction in the space between the turbulator and the inlet to the heat exchanger tubes.

BRIEF DESCRIPTION OF THE DRAWINGS

While the specification concludes with the claims particularly pointing out and distinctly claiming the present invention, it is believed that the apparatus and use of the present invention will be better understood from the following description in conjunction with the accompanying drawings.

DETAILED DESCRIPTION OF THE INVENTION

Figure 1:
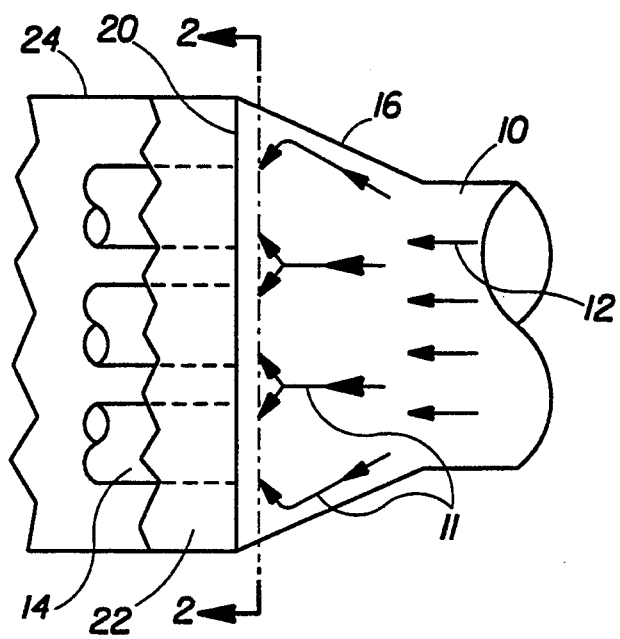
FIG. 1 is a partially cut away view of a heat exchanger according to the prior art showing the principle flow pattern in front of the inlet to the heat exchanger tubes.
Figure 2:
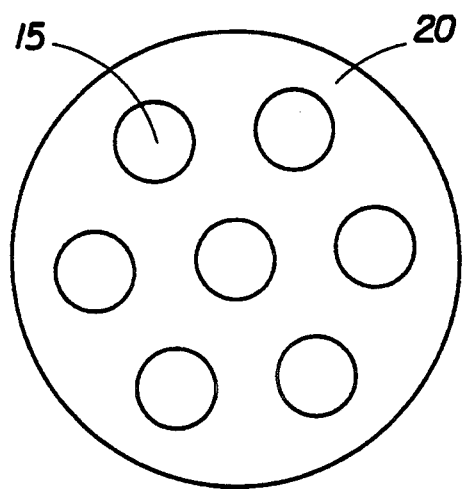
FIG. 2 is a side view along the line 2—2 of FIG. 1.

A typical embodiment of a heat exchanger system according to the present invention has a nest of tubes. As shown in FIG. 1, a common heat exchanger (24) of the prior art has a main body which is connected to the supply line (10) through an inlet chamber (16). The liquid to be treated in the heat-exchanger (24) flows in a main direction (12) through the supply line (10). In the inlet chamber (16) the flow direction (12) is changed such that the liquid reaches the heat exchanger (24) tubes (14) which are connected to the inlet (20). As shown in FIG. 2 the inlet (20) consists essentially of a baffle plate having inlet apertures (15) through which the liquid to be treated by the heat exchanger enters the heat exchanger tubes (14).

The heat exchanger (24) further has an entry and exit for the cooling or heating medium which flows into the heat exchanger chamber (22) around the tubes (14) but which are not shown in the drawings.

The flow (12) moving from the supply pipe (10) into the inlet chamber (16) has to change flow direction in order to proceed through the apertures (15) in the inlet (20) into the tubes (14). The resulting flow pattern (11), as indicated in FIG. 1, does result in no or low flow velocity spaces also called dead-spaces between the apertures (15).

The particle-in-liquid dispersion for which the heat exchanger system according to the present invention has been designed are such that at a velocity below a critical velocity the particles start to sediment out of the dispersion and collect in dead spaces created by low flow or no flow patterns. In particular, dispersions having a decreased viscosity, with a temperature reduction would tend to show strong dead space phenomena on the inlet plate (20) of a prior art heat exchanger (24) used for cooling. Particularly liquids which are sensitive to biological or chemical reactions taking place in dead space areas, like for example beverage products like fruit juice containing beverages, which are kept aseptic, are endangered of developing deficiencies, e.g. bacterial growth, in places where the liquid is trapped in a dead space.

Other particle-in-liquid dispersions which are treated by heat exchanger are for example paper pulp suspensions, soup, liquefied baby food or cosmetic suspensions. The particle size is not as critical as whether the particles have a tendency to sediment in dead-space. Such sediment-forming particles include fruit pulp particles, especially orange particles which have diameters ranging from 150 micrometers to several mm. Fruit sacks of oranges can reach well over 30 mm lengths.

Figure 3:
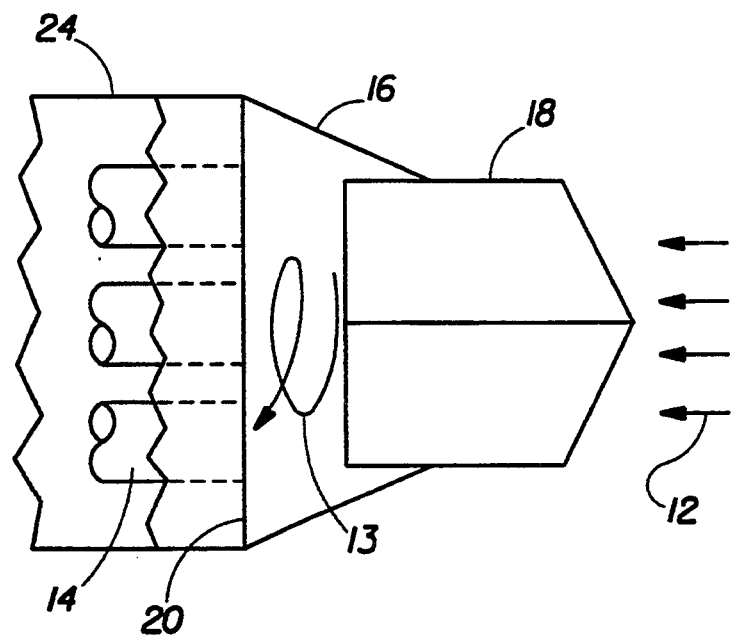
FIG. 3 is a partially cut away view of an embodiment of the present invention showing the rotational flow pattern in front of the inlet to the heat exchanger tubes.

In order to overcome this problem of slow flow and sedimentation in dead spaces at the heat exchanger inlet (20), an aseptic turbulator has been developed which provides a super imposed flow perpendicular to said primary flow direction (12) just in front of the inlet (20), thereby reducing or eliminating the dead spaces. As shown in FIG. 3, a preferred embodiment of the turbulator (18) provides a rotational flow pattern (13) which sweeps away any particles otherwise clogging the apertures (15) by sticking to the inlet (20).

Figure 4:
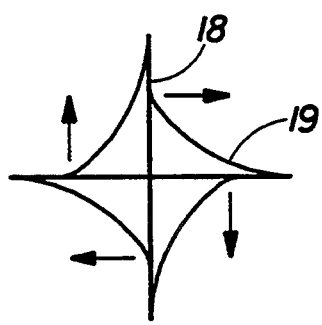
FIG. 4 shows the perpendicular flow component creating the rotational flow pattern of FIG. 3 which is provided by a preferred embodiment of the turbulator according to the present invention.

The turbulator (18) known in the art. In insert known in the art. In should be a static element which provides the desired flow pattern (13) by partially redirecting the main flow direction (12). A preferred pattern of the perpendicular flow component to create the preferred rotational flow pattern (13) is shown in FIG. 4. The main incoming flow (12) is split by a static turbulator (18) into 4 quarter-streams. Each quaternary stream is directed into one direction providing an overall picture of a right-hand (as shown) or left-hand turning flow. This redirection is provided by gradually tilting surfaces (19) relative to the main flow direction (12). Alternative turbulators can be provided by bent or straight guiding plates installed non-parallel to the main flow direction (12) and which are easily defined and optimized by simple experiments for those skilled in the art. Another alternative can be provided by static propellers or turbines. The preferred redirection of the main flow (12) is into the spiral form (13) as shown in FIG. 3. However, other flow patterns, which may be desired, can be accomplished by alternative turbulator designed obtainable by those skilled in the art through simple experimentation.

EXAMPLE

In this example a fruit juice containing beverage flows through an aseptic treatment system which contains the heat exchanger system according to the present invention. In parallel the same process was carried out using the same heat exchanger without the turbulator insert. The particle-in-liquid dispersion consisted of 60% by weight orange juice which contained 10% by weight orange pulp particles of a particle size between 300 micrometers and 30 mm and 40% by weight of a sugar solution. The dispersion had a 13° Brix (13% by weight sugar) content. The heat exchanger was a nest of tubes heat exchanger available from Aluminum Pressure Vessel, Unna-Koenigsborn, Germany, operated at a flow of 600 liter/minute. The inner tube diameter was 14 mm. The turbulator insert was made of thin sheet metal, 1 mm thick stainless steel, splitting the flow into four parts and superimposing a flow component perpendicular to the main flow direction according to FIG. 4. This achieved a spiral flow pattern in front of the inlet to the heat exchanger tubes.

The tests were run over a 30 day period. After each interruption the heat exchanger was cleaned from clogging pulp and the system was treated to establish sterile conditions in the aseptic system. Interrupting the test for cleaning became necessary once the pressure drop over the heat exchanger tubes increased by more than 20% over the normal pressure drop just after cleaning.

|  | Conventional Heat Exchanger | Heat Exchanger System of the Present Invention |
| --- | --- | --- |
| Total time of experiment | 30 days | 30 days |
| Actual running time | 528 hours | 528 hours |
| Number of cleanings due to heat exchange pressure drop exceeding 20% of start-up pressure drop | 49 | 28 |
| Index of cleaning cycles | 100 | 57 |

As can be seen from the above table, the heat exchanger system according to the present invention reduced the cleanings caused by heat exchanger clogging by 43%.

An additional advantage of the heat exchanger system according to the present invention is the quality improvement for the particle-in-liquid dispersion which can be expected when reducing the probability of sedimentation and particles remaining in a dead space over an extended period. For fruit juices containing beverages this translates into reduced likeliness of burned or other off-flavors.

What is claimed:

1. A heat exchanger improvement for treating particle-in-liquid dispersions, said heat exchanger improvement comprising:
   a) a nest of tube through which said particle-in-liquid dispersions flow in a primary flow direction from a point upstream to a point downstream from a heat exchanger, said heat exchanger having an entrance chamber located upstream from said nest of tubes, said nest of tubes having an inlet end; and b) a static turbulator centrally mounted within said entrance chamber and spaced apart from said inlet end of said nest of tubes, said static turbulator having a splitter which subdivides said particle-in-liquid dispersions into at least two flow streams, said static turbulator also having gradually tilting surfaces which impart to each of said at least two flow streams a rotational flow pattern with an overall rotation in one direction at said inlet end of said nest of tubes, said rotational flow pattern being perpendicular to said primary flow direction of said particle-in-liquid dispersions so that said rotational flow pattern sweeps away any particles which sediment out of said particle-in-liquid dispersions in order to prevent said particles from being trapped at said inlet end of said nest of tubes.

2. The heat exchanger of claim 1 wherein said static turbulator has a splitter which subdivides said particle-in-liquid dispersions into four flow streams.

3. A method for preventing particles in particle-in-liquid dispersions from being trapped at an inlet end of a nest of tubes in a heat exchanger, said method comprising the steps of:

a) providing a flow of particle-in-liquid dispersions to said inlet end of said nest of tubes in said heat exchanger, said flow having a primary flow direction from a point upstream to a point downstream from said heat exchanger;

b) subdividing said flow of particle-in-liquid dispersions into at least two flow streams near said inlet end; and c) providing each of said at least two flow streams with a rotational flow pattern having an overall rotation in one direction at said inlet end of said nest of tubes, said rotational flow pattern being perpendicular to said primary flow direction of said particle-in-liquid dispersions, so that said rotational flow pattern sweeps away any of said particles which sediment out of said particle-in-liquid dispersions.

4. The method of claim 3 wherein said flow of particle-in-liquid dispersions is subdivided into four flow streams.

* * * * *

UNITED STATES PATENT AND TRADEMARK OFFICE
CERTIFICATE OF CORRECTION

PATENT NO. : 5,375,653
DATED : December 27, 1994
INVENTOR(S) : Axel Borlinghaus and Howard R. Steen It is certified that error appears in the above-indentified patent and that said Letters Patent is hereby corrected as shown below:

*Column 3, line 51, after "18" delete -- known in the art. In insert known --.*

*Column 3, line 52, before "should" delete -- in the art. In --.*

Signed and Sealed this

Eleventh Day of April, 1995

*Attest:*

BRUCE LEHMAN

*Attesting Officer*     *Commissioner of Patents and Trademarks*